Nov. 23, 1937.  W. C. HACKMAN  2,099,975
LIGHT PROJECTING APPARATUS
Filed June 26, 1935   2 Sheets-Sheet 1
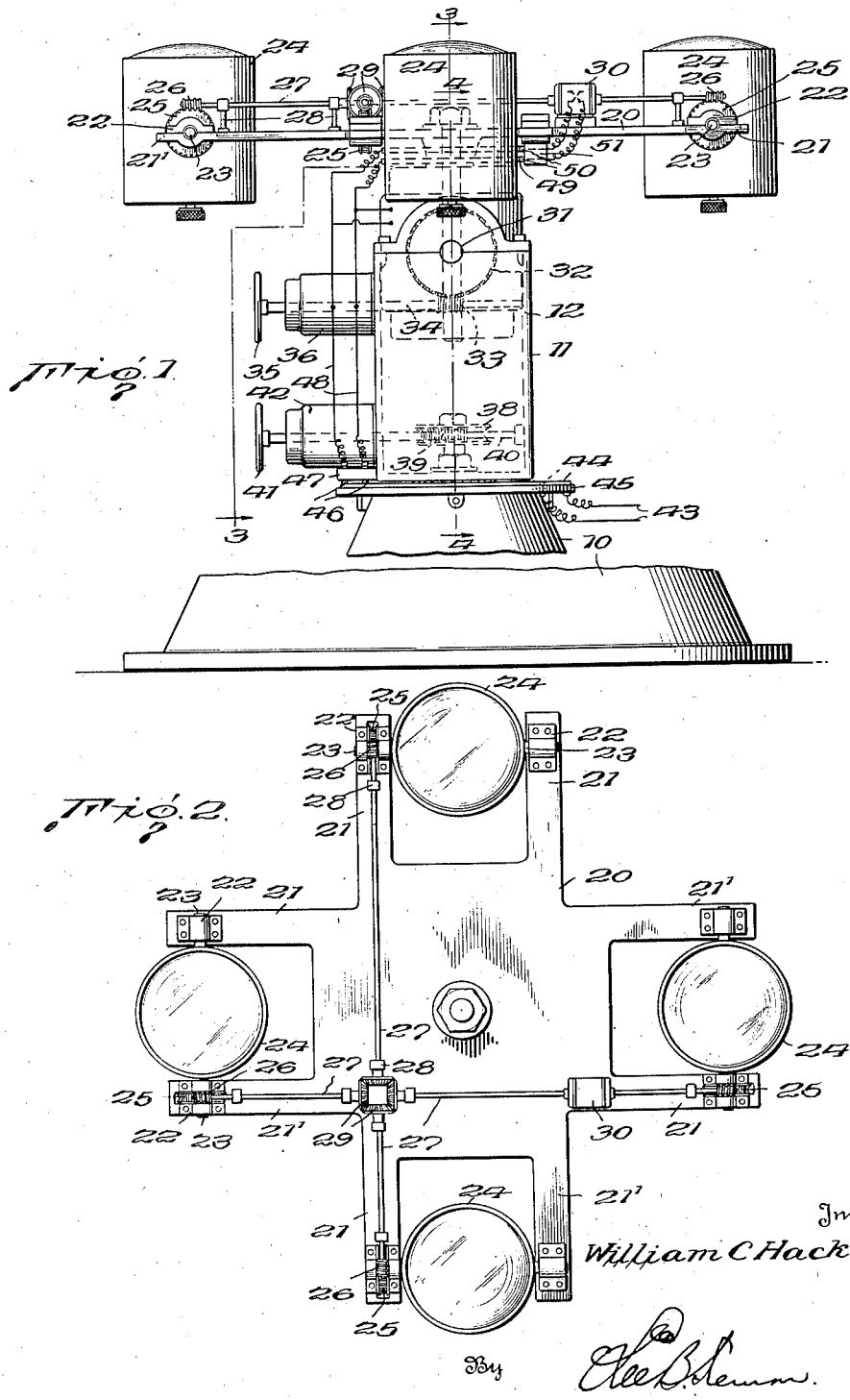

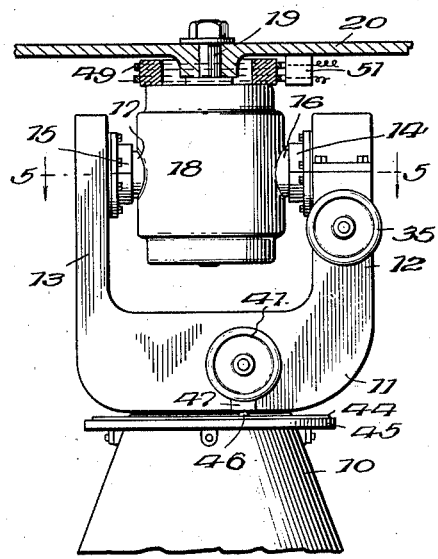
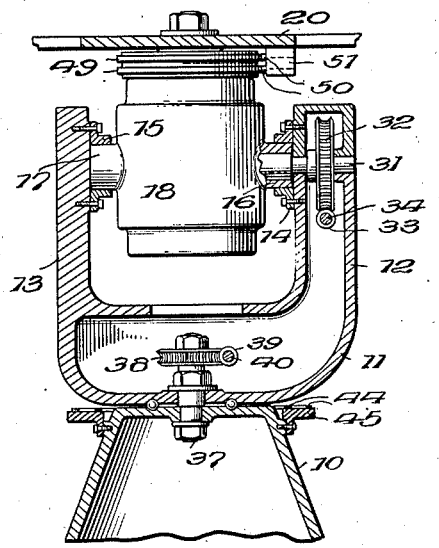
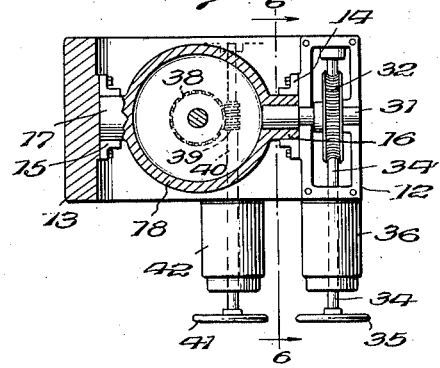
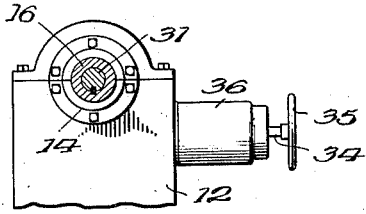

Patented Nov. 23, 1937

2,099,975

UNITED STATES PATENT OFFICE 2,099,975

LIGHT PROJECTING APPARATUS

William C. Hackman, Baltimore, Md.

Application June 26, 1935, Serial No. 28,544

11 Claims. (Cl. 240—49)

My invention relates to improvements in search-lights or light beam projectors in which two or more individual light beam projectors are grouped together to produce a coordinated projection of light. One object of my invention is to provide an apparatus for effecting a complete control over a multiplicity of light beam projectors, i. e. to vary the shape of the beam produced thereby, and to change the direction of said beam both in a vertical plane and in a horizontal plane.

Another object of my invention is to provide means for producing a light beam, which means may be entirely, or in part, governed by remote control means.

Yet another object of my invention is to provide improved means for simultaneously moving a plurality of light beam projectors so as to produce a unified light beam of varying shape and size.

Other objects of my invention will appear from the following description of my invention.

In the appended drawings is shown a preferred embodiment of my invention:

Figure 1 represents a view in elevation of a complete assembly of my improved apparatus;

Figure 2 is a plan view corresponding to Figure 1;

Figure 3 is a view of a partial section taken along line 3—3 of Figure 1;

Figure 4 is a similar sectional view taken on the line 4—4 of Figure 1;

Figure 5 is a horizontal view, partly in section, taken on the line 5—5 of Figure 3;

Figure 6 is an elevational view, partly in section, taken on the line 6—6 of Figure 5.

In the drawings, reference numeral 10 represents a base or pedestal, upon which is rotatably mounted the standard 11, having uprights 12 and 13. These uprights support the bearings 14 and 15, for pivotally supporting trunnions 16 and 17 of an electric motor 18. Upon the vertical shaft 19 of the motor 18, there is mounted to turn therewith a plate or table 20, having a number of symmetrically arranged supports or arms 21, 21' provided at their outer extremities with bearings 22, rotatably supporting trunnions 23 of the search-lights or projectors 24. This method of mounting search-lights 24 upon table 20, at or about their center of gravity, as shown, is preferred since a structure is thereby obtained which permits of rotation by motor 18 at high speeds as is more fully explained below.

In order to simultaneously rock or tilt the search-lights 24 upon their trunnions, as will be more fully explained below, a worm wheel 25 is secured to one trunnion of each search-light. Meshing with each of the worm wheels 25 is a worm 26, mounted on, and driven by shafts 27, which shafts are suitably journalled in the brackets 28, upon the plate 20. The shafts 27 are connected together by means of bevel gears 29, so that rotation of one of said shafts, as by means of an electric motor 30, will rotate all of shafts 27 simultaneously, the direction of pitch of worm wheels 25 and worms 26 being preferably so chosen that the motor 30 is effective to rock all of the search-lights 24 either toward or away from the center of plate 20.

Means are also provided for rocking or tilting the plate 20 as a whole, in a vertical plane. Keyed within trunnion 16 of motor 18, or otherwise rigidly secured thereto, is a shaft 31 (Figs. 4, 5, and 6) driven by a wormwheel 32, and suitably housed within the hollow upright 12. The wormwheel 32, in turn, is driven by a worm 33, secured to shaft 34 for rotation therewith. Handwheel 35 is provided for manually rotating shaft 34, and an electric motor 36 is also provided for effecting a similar rotation of this shaft.

Further means are provided for changing the direction of the light beam by rotating standard 11 in a horizontal plane, thereby correspondingly varying the position of plate 20 etc. Fixed against rotation to base 10 and journalled in standard 11 is a shaft 37, having fixed thereto a wormwheel 38 engaged by a worm 39, carried by shaft 40. Shaft 40 may be rotated by means of handwheel 41, and in the preferred embodiment an electric motor 42 is also provided for effecting rotation of shaft 40.

My invention also includes provision of means for supplying electrical current to the search-lights 24 and electric motors 18, 30, 36, and 42. Reference numeral 43 (Fig. 1) designates a supply circuit feeding electrical energy to insulated rings 44 mounted on plate 45 secured to the base 10. Brushes 46 mounted in holder 47 secured to standard 11 convey the electricity in turn to a circuit 48, from which motors 18, 36, and 42 may be directly supplied. In order to energize motor 30 for tilting the search-lights 24, and for energizing the lights themselves insulated rings 49, fed from circuit 48, are provided on one end of the housing for motor 18. Brushes 50 carried by holder 51 mounted on the underside of plate or table 20 provide means for conducting electricity to the latter, in order to secure an energy source thereon. Search-lights 24 and motor 30 may be connected to this source in the usual manner.

From the above description, the operation of my invention will be apparent. Motor 18 is preferably operated at a sufficiently high rate of speed, depending upon the number of search-lights 24 used, that a unified beam of light is produced of greater size and intensity than would be possible with a single lamp. While the search-lights 24 are lighted, and while they are being rotated as a unit by motor 18, the shape of the beam produced may be varied by operation of the motor 30. The shape of the beam will, of course, vary from that of a cylinder, for the position of the lamps as shown in Fig. 1, to that of a cone of greater or less pitch depending upon the extent of operation of motor 30.

Also, simultaneously, if desired, while the lamp unit is being rotated, and the shape of the beam is being varied, as described above, handwheels 35, 41 or motors 36 and 42 may also be operated. Operation of handwheel 35 or motor 36 serves to tilt the lamp unit as a whole, so as to vary the vertical angle of the light beam produced; while operation of handwheel 41 or motor 42 varies the horizontal angle or azimuth of the light beam. In this way, complete control over the shape and direction of the light beam is effected.

My invention is applicable to numerous uses. For example, it may be used to locate objects at night in the sky i. e. aircraft. For this use, a wide angle for the cone of light produced might be first employed until the desired object is located. Thereupon the spread of light may be reduced to concentrate same upon the object, while simultaneously directing the beam so as to keep the object within the field of vision. So used, either in connection with army fortifications or upon war vessels, my device readily permits of the complete remote control of the light beam. This, of course, is desirable, since a search-light in warfare, forms a more or less ready target for enemy fire.

My invention might also be employed in connection with aircraft landing fields, on water craft, in the exterior illumination of buildings, for producing stage effects, etc.

To simplify the drawings, only a single electrical circuit has been shown. However, it will be obvious that additional circuits may be provided in the same manner, together with individual switches etc., to permit of the individual control and operation of lights 24 and motors 18, 30, 36, and 42, whereby automatic and remote control means may be provided for use with my improved apparatus.

Moreover, while four search-lights are shown in the drawings, any number, two or more may be used, the larger the number the more intense the beams produced, and the slower will it be necessary to rotate plate 20. Other modifications will readily occur to one skilled in the art, all of which are considered to be a part of my invention within the scope of the appended claims.

I claim:

1. In light projecting apparatus, the combination comprising a plurality of electric light beam projectors, means for pivotally supporting said projectors in symmetrical relation to a single axis, said supporting means including electric means for simultaneously tilting each said projector in a plane including said projector and said axis, electric means for rotating said supporting means, whereby a unified light beam is produced by said projectors, means for tilting said supporting means in a vertical plane to vary the elevation of said light beam, means to rotate as a unit all of said previously recited structure, whereby the azimuth of said light beam may be varied, and electric supply means for feeding electrical energy to said electric light beam projectors and to said electric means.

2. Apparatus for projecting a beam of light of variable shape and direction comprising a frame, an electric motor, trunnions projecting from opposite sides of said motor, bearings for said trunnions in said frame whereby said motor may be mounted for pivotal movement on said frame, said motor including a shaft, a support mounted upon said shaft for rotation therewith, a plurality of light beam projectors, pivotal means for mounting said projectors upon said support, means for rocking in unison said projectors on said pivotal means, and means for rocking said motor on its trunnions to adjust the motor relative to said frame and for maintaining the motor in the adjusted position.

3. Apparatus for projecting a beam of light of variable shape and direction comprising a base, a frame, pivotal means for mounting said frame for pivotal movement upon said base, an electric motor, trunnions projecting from opposite sides of said motor, bearings for said trunnions in said frame whereby said motor may be mounted for pivotal movement on said frame, said motor including a shaft, a support mounted upon said shaft for rotation therewith, a plurality of light beam projectors, pivotal means for mounting said projectors upon said support, means for rocking in unison said projectors on said pivotal means, means for rocking said motor on its trunnions, and means for rotating said frame with respect to said base.

4. In light projecting apparatus, the combination of a plurality of electric light beam projectors adapted to have their light beams extend in the same general direction, means for supporting said projectors including electric motor means for continuously rotating said projectors as a group to produce a unified light beam and electric motor means for tilting said projectors to vary the shape and direction of said light beam, and electric supply means for feeding electrical energy to said electric light beam projectors and to said electric motor means.

5. In light projecting apparatus, the combination comprising a plurality of electric light beam projectors, means for pivotally supporting said projectors in symmetrical relation to a single axis, said supporting means including electric means for simultaneously tilting each said projector in a plane including said projector and said axis, electric means for rotating said supporting means, whereby a unified light beam is produced by said projectors, electric means for tilting said supporting means in a vertical plane to vary the elevation of said light beam, electric means to rotate as a unit all of said previously recited structure, whereby the azimuth of said light beam may be varied, and electric supply means for feeding electrical energy to said electric light beam projectors and to said electric means.

6. In light projecting apparatus, the combination of a plurality of light beam projectors, a support for said projectors, an electric motor including a shaft to which said support is secured for rotation thereby to produce a unified light beam, trunnions projecting from opposite sides of said motor, a supporting frame for said motor including bearings receiving said trunnions whereby the latter may be tilted or rocked in a vertical plane to vary the elevation of said unified light beam, and a support for said frame including means for rotating the latter in a horizontal plane to vary the azimuth of said unified light beam.

7. In light projecting apparatus the combination of a support, electric means for continuously rotating said support, a plurality of light beam projectors carried by said support and adapted to have their light beams extend in the same general direction as the projected axis of rotation of said support to produce a unified light beam upon rotation of said support, means for mounting said support whereby the latter may be tilted or rocked in a vertical plane to vary the elevation of said unified light beam and to provide for adjusting said unified beam in an arc over the apparatus and from one to the other side thereof, and a support for said mounting means including means for rotating the latter in a horizontal plane to vary the azimuth of said unified light beam.

8. In light projecting apparatus, the combination of a support, an electric motor including a shaft to which said support is secured for rotation thereby, a plurality of light beam projectors carried by said support and adapted to have their light beams extend in the same general direction as the projected axis of rotation of said support to produce a unified light beam upon rotation of said support, pivotal means supporting said motor whereby the latter may be tilted or rocked in a vertical plane to vary the elevation of said unified light beam and to provide for adjusting said unified beam in an arc over the apparatus and from one to the other side thereof, and a support for said pivotal means including means for rotating the latter in a horizontal plane to vary the azimuth of said unified light beam.

9. In an apparatus as described in claim 7, means for simultaneously tilting each projector relative to the support carrying the projectors and in a plane including said projector and the axis of rotation of said support.

10. In a light projecting apparatus, the combination of a plurality of light projectors, a carrier for said projectors, electric means on said carrier for adjusting the projectors relative thereto, and an electric motor including a shaft to which said carrier is secured for continuous rotation thereby, said shaft being the sole support for said carrier, electric means, and light projectors.

11. In light projecting apparatus, the combination of a plurality of light beam projectors, a rotatable support for said projectors, means for tilting said projectors to adjust their individual beams from a direction which is substantially normal to the axis of rotation of said support, to a direction which is substantially parallel to said axis, and means for continuously rotating said support, whereby the apparatus may be used to produce a plurality of moving radial beams or a unified light beam.

WILLIAM C. HACKMAN.